United States Patent [19]

Yonezawa

[11] Patent Number: 4,597,709
[45] Date of Patent: Jul. 1, 1986

[54] TRANSFERRING DEVICE FOR DIES AND THE LIKE

[75] Inventor: Keitaro Yonezawa, Itamishi, Japan

[73] Assignee: Aioi Seiki K.K., Itamishi, Japan

[21] Appl. No.: 518,961

[22] Filed: Aug. 1, 1983

[51] Int. Cl.⁴ .............................................. B65G 67/24
[52] U.S. Cl. ................................. 414/401; 104/1 R;
  104/48; 198/345; 414/499
[58] Field of Search ............... 104/1 R, 48, 49, 34;
  414/750, 396, 401, 499, 584; 198/345

[56] References Cited

U.S. PATENT DOCUMENTS

| | | | |
|---|---|---|---|
| 3,402,674 | 9/1968 | Tomita | 104/1 R |
| 4,239,445 | 12/1980 | Ozawa | 104/48 X |
| 4,435,250 | 3/1984 | Lindgren | 104/1 R X |
| 4,461,215 | 7/1984 | Sims | 104/1 R |

FOREIGN PATENT DOCUMENTS

| | | | |
|---|---|---|---|
| 131546 | 7/1978 | German Democratic Rep. | 104/1 R |
| 645906 | 2/1979 | U.S.S.R. | 104/1 R |
| 808345 | 3/1981 | U.S.S.R. | 104/48 |

*Primary Examiner*—Randolph A. Reese
*Attorney, Agent, or Firm*—Bacon & Thomas

[57] ABSTRACT

The present invention relates to a transferring device for dies of presses and work pallets of machine tools and the like. A die transfer car is movable on two parallel rails, one side of the car is provided flanged wheels and the other side of which is provided plain wheels. When the car is stopped by a stopper having a stopper pin provided at the plain wheel side, through a stopping control device, the car is frictionally stopped by the flanges of the wheels and the side face of rails due to rotation caused by the inertia force around the stopper pin.

4 Claims, 18 Drawing Figures

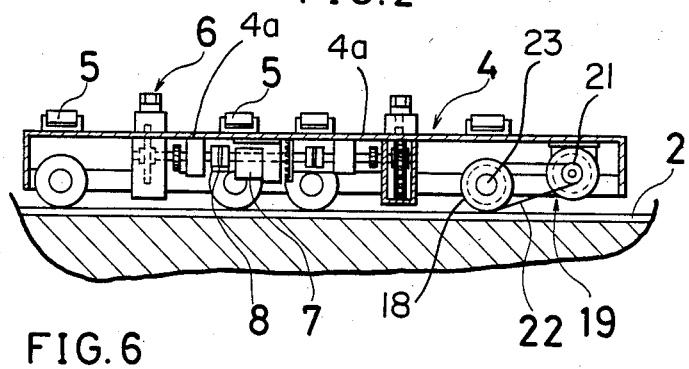
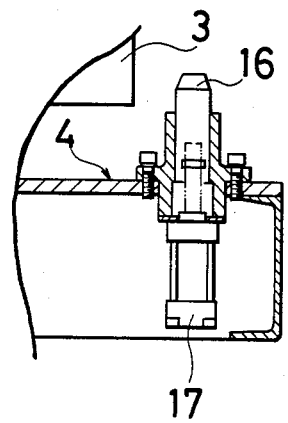
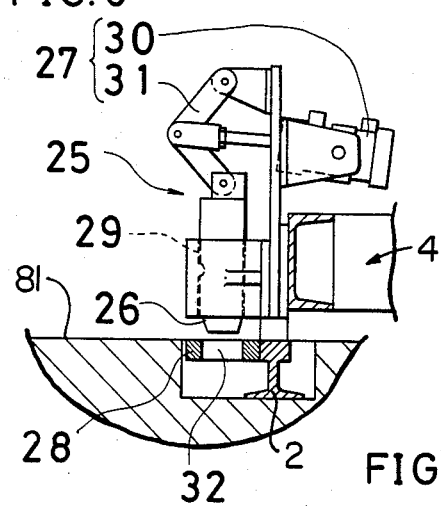
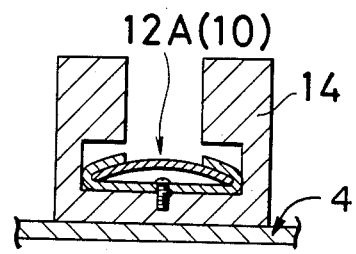
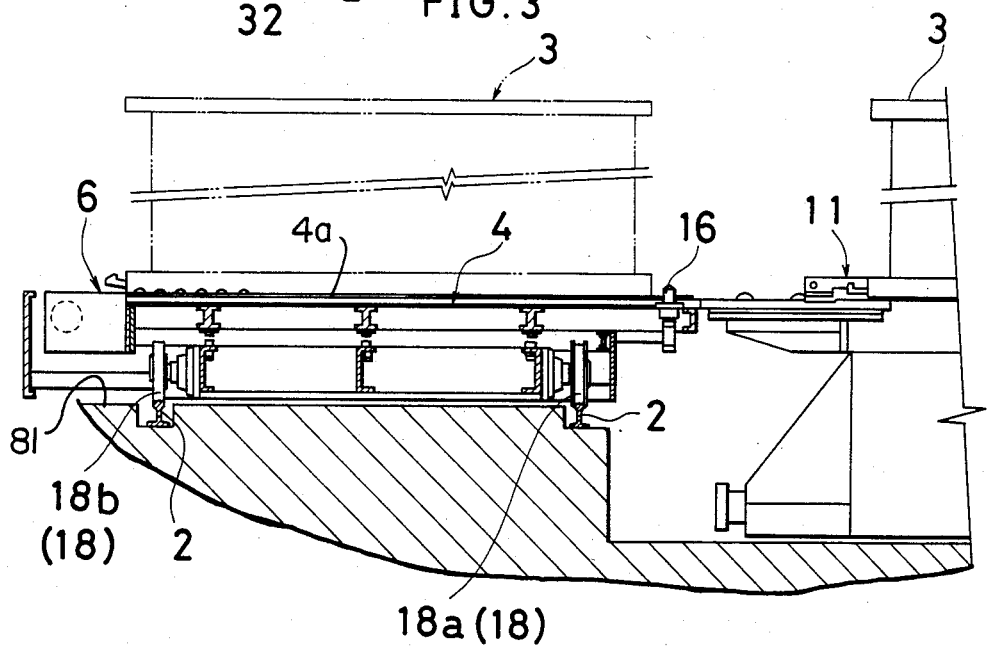

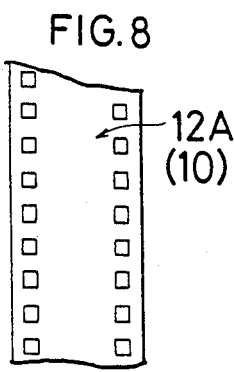
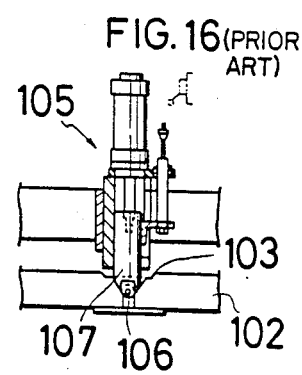
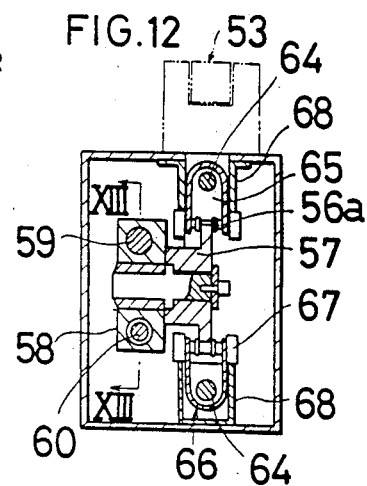
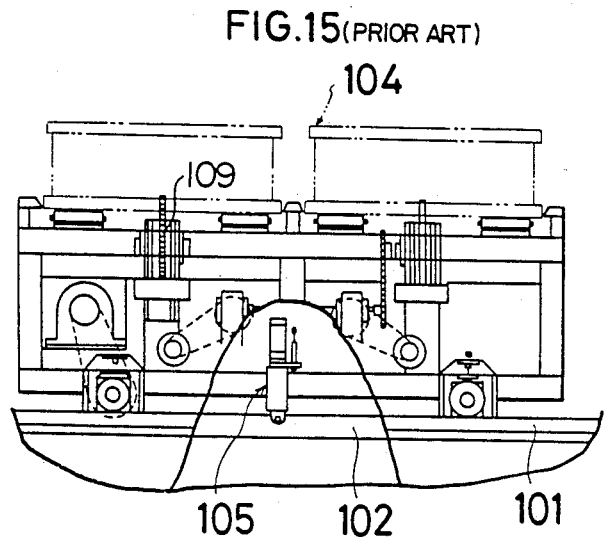
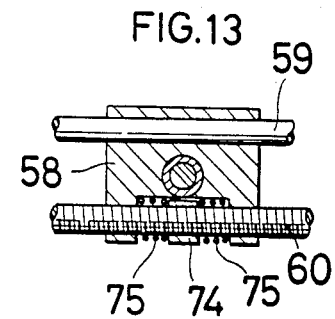

TRANSFERRING DEVICE FOR DIES AND THE LIKE

BACKGROUND OF THE INVENTION

The present invention relates to a transferring device for dies of presses, injection molding machines, forging machines, diecasting machines and work pallets of machine tools and the like.

The above-mentioned transferring device for dies and the like is for taking dies and the like in or out of the the machines as enumerated above, and for the purpose quite a variety of devices have been put to practical use.

As an example of conventional devices essential parts of the "Press dies transfer device" (Japanese Publication No. Sho-55-48535) are shown in FIGS. 14–16.

A die transfer device for a press 100 has a stopper rail 102 between two, front and rear, rails 101, and it is so adapted that a travelling car 104 is stopped when a piston rod 107 having an idler 106 of a stopper means on the car 104 engages the V-notched part 103 of the stopper rail 102. Numeral 109 designates a push-pull device using chain.

This conventional device has the following shortcomings.

(1) Since the car 104 and the dies are both heavy and the travelling speed is high, the stopper means 105 and the V-notched part 103 are subjected to a great impact, are vulnerable to deformation and damage and lack in durability.

(2) Since the car 104 is brought to a sudden stop, the dies on the car 104 slide with their inertia force on the roller conveyor 108 on which they sit, and the position of the dies with respect to the press 100 is subject to an error.

SUMMARY OF THE INVENTION

The present invention, which is aimed at overcoming the above-mentioned shortcomings, has the following features.

It relates to a transferring device for dies and the like comprising rails, car, stopper means and stopping control means, wherein the rails, a pair of front and rear rails, are laid on the floor in parallel. The car has on its topside at least one seat for dies and the like. At least one of the wheels of the car is arranged to be driven by a car drive gear, and the wheels riding on one rail are flanged, while those riding on the other rail are plain without flanges. The stopper means comprises a stopper pin, stopper pin driving means and a stopper plate. The stopper pin and the stopper pin driving means are provided either on the underside of the car on the side of the the other rail, or on the fixed side of that rail or the floor in its vicinity, and the stopper plate on the other. The stopper pin is vertically movable by the stopper pin driving means, and the stopper plate is provided with a mating hole so that the car can be stopped at the predetermined stop position by engaging the stopper pin in the mating hole. The stopping control means comprises a detection means which detects the car when it has reached the start-to-stop position in the vicinity on either, left or right, side of the predetermined stopping position and a stop commanding means. The stop commanding means acts on the detection signal from the detection means to stop the car drive gear, and at the same time the stopper pin is advanced by the stopper pin driving means toward the stopper plate so as to engage in the mating hole. As the car begins to stop, the car is caused to rotate slightly by its inertia force around the center of the stopper pin so that the flanges of the flanged wheels on the other rail come into frictional contact with the sides of the rail, thus stopping the car softly without shock.

According to the present invention as mentioned above, the stopping control means acts on the detection signal from the detection means to stop the car drive gear, and at the same time the stopper pin is advanced by the stopper pin driving means toward the stopper plate to engage the mating hole therein so that the car is stopped at the predetermined stopping position through engagement of the stopper pin in the mating hole in the stopper plate. As the car starts to stop, the car is caused to rotate slightly by its inertia force around the center of the stopper pin with the car's plain wheels sliding on the rail so that the flanges of the flanged wheels on the other rail come into frictional contact with one side or both sides of the rail, thus the car is stopped softly.

Since the impact to the stopper means is largely alleviated, the loading conditions for the stopper pin and stopper plate of the stopper means as well as structural members of the car carrying the stopper means are greatly eased. This lowers the risk of deformation thereof and damage thereto and improves the durability.

Also eliminated is the risk of the sliding of the dies due to sudden stopping of the car. Thus, the positioning of the dies in general with respect to a press or the like can be done with improved accuracy.

Further, even if the car's travelling speed is raised, the car can be stopped securely without any undue impact.

Moreover, since the stopper means, stopping control means and the like of the present invention requires nothing more than changing the mounting position of the stopper means, and the selective use of the flanged wheels and plain wheels, there is no need for any special, complicated and/or expensive devices. The invention, which is quite simple and inexpensive to apply, is also readily applicable to existing machines of various kinds.

In the accompanying drawings, there are shown illustrative embodiments of the invention from which these and other of its objectives, novel features, and advantages will be readily apparent.

BRIEF DESCRIPTION OF THE DRAWINGS

FIGS. 1 through 9 show a first embodiment of the present invention, in which:

FIG. 1 is a plan view of a transferring device placed in front of a vertical press, FIG. 2 is a front view in vertical section of a car of the transferring device, FIG. 3 is a sectional view taking along line III—III in FIG. 1, FIG. 4 is enlarged side view in vertical section of a push-pull device, FIG. 5 is a side view in vertical section of a stopper, FIG. 6 is a side view in vertical section of a stopper means, FIG. 7 is a front view in vertical section of a guide means of the push-pull device, FIG. 8 is a fragmentary plan view of a modification of the driving band of the push-pull device, and FIG. 9 is a front view in vertical section of the guide means for the driving band of FIG. 8.

FIGS. 10 through 13 show a second embodiment of the present invention, in which:

FIG. 10 is a general perspective view of a horizontal injection molding machine and a transferring device placed in front thereof, FIG. 11 is a side view in vertical section of a push-pull device, FIG. 12 is a sectional view taken along line XII—XII in FIG. 11, and FIG. 13 is a sectional view taken along line XIII—XIII in FIG. 12.

FIGS. 14 through 16 show a conventional counterpart, in which:

FIG. 14 is a plan view of a press and a transferring device for dies thereof,

FIG. 15 is a partially broken front view of the transferring device for dies, and FIG. 16 is a front view of a stopper means.

DETAILED DESCRIPTION OF THE INVENTION

Figure 1:
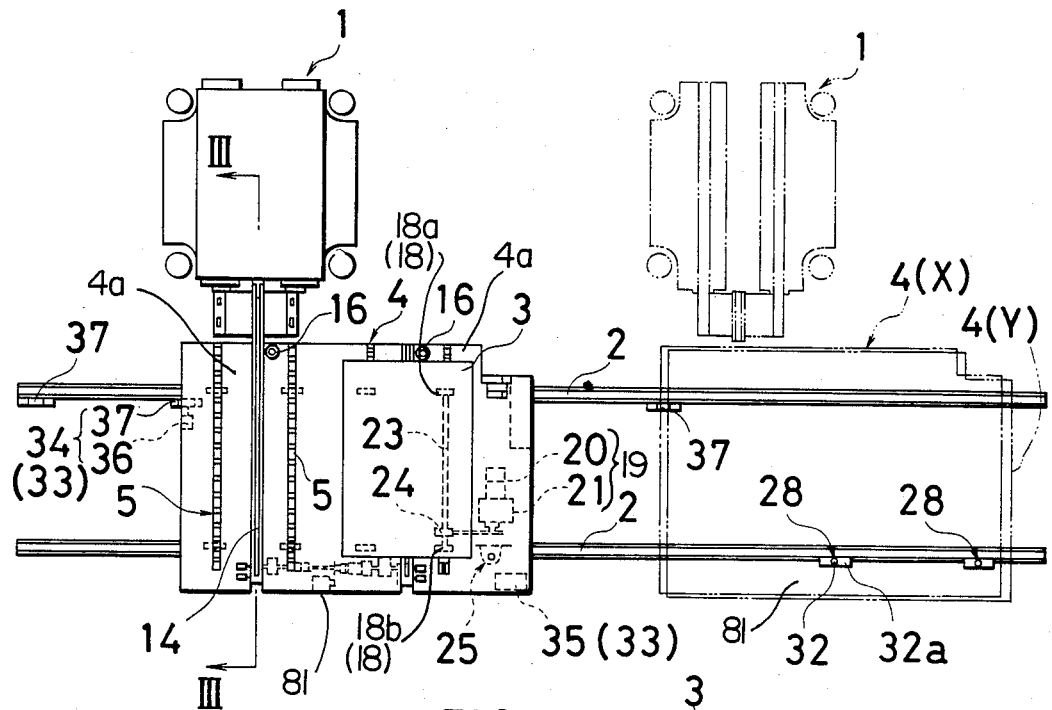
Figure 4:
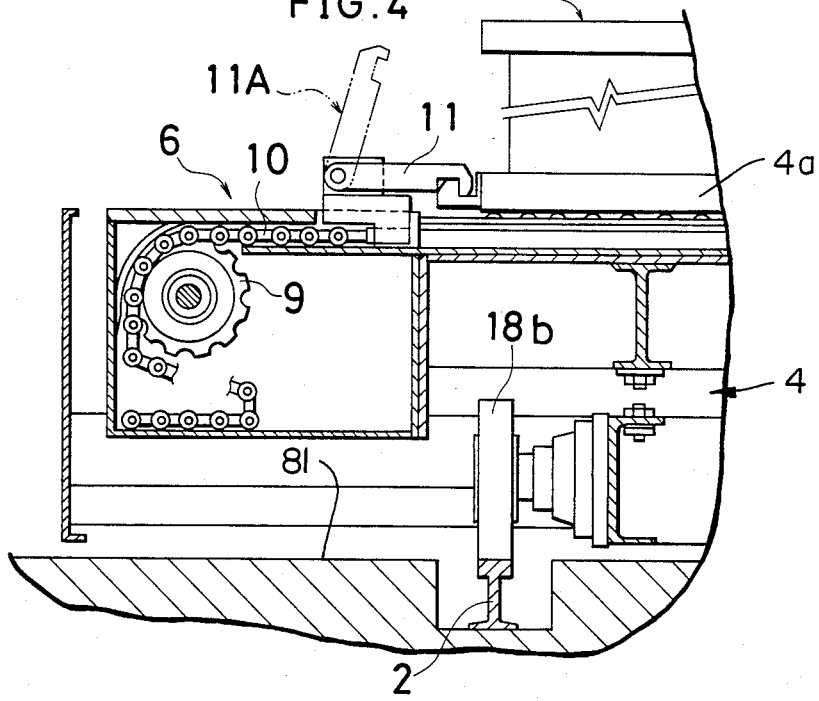
Figure 7:
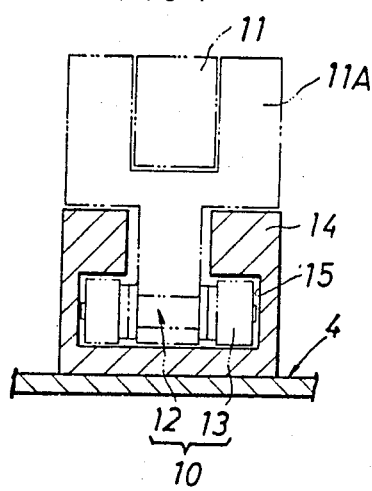
Figure 14:
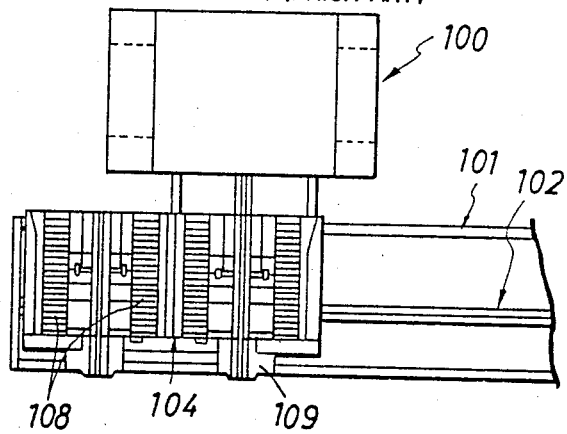
Figure 11:
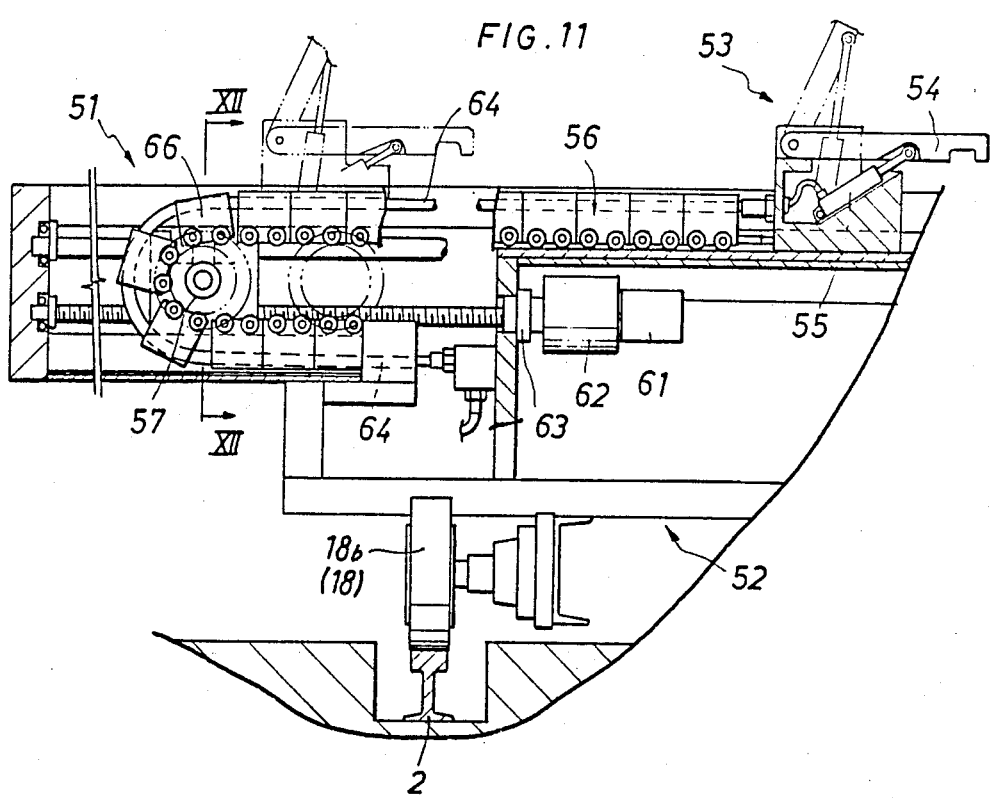
Figure 10:
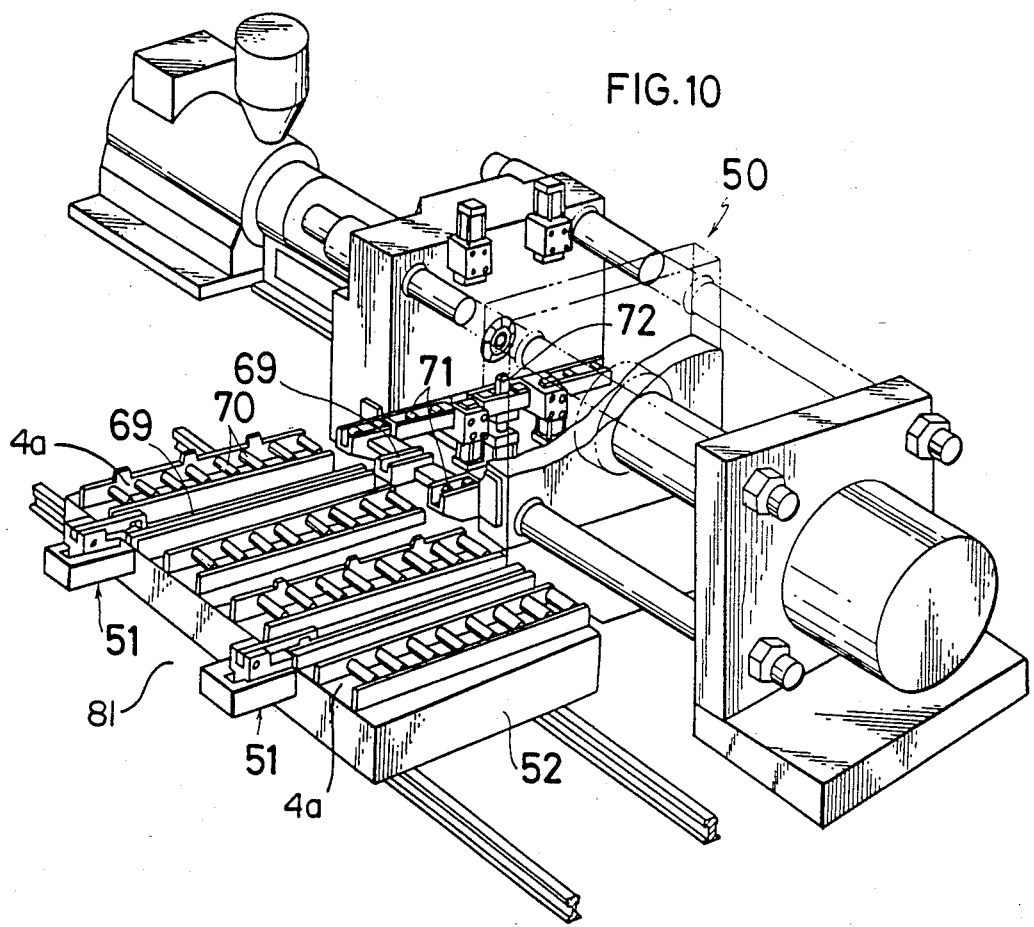

Referring to the accompanying drawings, embodiments of the present invention will be described below.

First embodiment (FIGS. 1 through 9.):

There are laid two rails 2 in parallel in front of a vertical press 1, and a car 4 for exchanging dies 3 for the press 1 can travel laterally on the rails 2.

On the topside of the car 4 there are provided seat or seats 4a for dies and the like, and each seat 4a is provided with a roller conveyor 5 for conveying the dies 3 longitudinally.

A pair of dies 3 can be transferred from the seat 4a on the car 4 onto the press 1 or vice versa by means of a push-pull device mounted on the car 4.

The push-pull devices 6 are provided for each of the two seats 4a of the car 4. Sprockets 9, which are rotationally driven by a common electric motor 7 or air motor via solenoid clutches 8, each drive one driving band 10 and each die 3 is caused to move forward or rearward on the roller conveyor 5 by means of the push-pull hook 11 of the push-pull hook means 11A connected to the forward end of the driving band 10.

The driving band 10 consists essentially of a steel chain 12 and idlers 13 on both sides thereof, and these idlers 13, which are guided by guide groove 15 of the guide means 14, prevent bending of the band 10 even when it is pushed.

In place of the above driving band 10, a steel band 12A illustrated in FIGS. 8 and 9 may as well be used.

Numeral 16 designates a die stopper which prevents longitudinal sliding of the dies 3 during travelling of the car 4, and is arranged to be vertically movable by a hydraulic cylinder 17.

The device or mechanism of the present invention is characterized in that, when exchanging the dies 3, the car 4 is stopped at the predetermined stopping position X in front of the press 1, the old dies 3 are transferred from the press 1 to either seat 4a of the car 4, then the car 4 is moved to the other predetermined stopping position X and the new dies 3 on the other seat 4a of the car 4 are transferred onto the bolster of the press 1.

The car 4 has 4 pairs of wheels 18 and the one pair of wheels 18 on the extreme right are driven by the car drive gear 19.

The car drive gear 19 comprises a brake motor 20, whose torque is transmitted via a reduction gear 21, chain 22 and a sprocket 24 mounted on a common axle 23 to the extremely right pair of wheels 18 for driving it forward or reverse.

Of the eight wheels 18, the four rear wheels 18 are flanged wheels 18a each with two flanges, while four front wheels 18 are plain wheels 18b without flange.

The car stopper means 25 comprises vertically downward stopper pin 26, stopper pin driving means 27 and stopper plate 28.

The stopper pin 26 is adapted to be freely engageable in the guide hole 29 in the underside of the car 4 near the front right end thereof above the front rail 2, and to be driven vertically by the stopper pin driving means 27 comprising a hydraulic cylinder 30 and a center bent link 31.

The stopper plate 28 is welded to the front side of the front rail 2 where it corresponds to the above stopper pin 26, and has provided therein at the longitudinal center thereof a mating hole 32 for engaging the stopper pin 26 when the car 4 is stopped at each predetermined stopping position X.

The above-mentioned center bent link 31 may be omitted and, instead, the piston rod of an inverted hydraulic cylinder may be connected directly with the stopper pin 26. A small hydraulic pressure source for the hydraulic cylinder 30 is provided on the car 4.

A stopping control means 33 comprises a detection means 34 and a stop commanding means 35.

The detection means 34 comprises a limit switch 36 provided on the car 4 and trigger pieces 37, which are so arranged that one thereof triggers the above limit switch 36 when the car 4 has arrived at a predetermined start-to-stop position Y in the vicinity of each predetermined stopping position X on the left or right thereof. The limit switch 36 then transmits the detection signal and thereupon the stopping control means 33 acts to stop the car drive gear 19 and supplies hydraulic pressure to the hydraulic cylinder 30 of the stopper means 25. The stopper 26 then comes down to the top side of the stopper plate 28, comes into contact with the guide face 32a on the top side of the stopper plate 28 on the left or right of the mating hole 32, the car 4 with its inertia force advances further and, when it has reached the predetermined stopping position X, the stopper pin 26 is engaged in the mating hole 32 and the car 4 is stopped thereby.

Then the front plain wheels 18b slip on the top of the rail 2, and since the car 4 with its inertia force rotates slightly around the center of the stopper pin 26, the front and rear flanges of the rear flanged wheels 18a come into frictional contact with the sides of the rear rail 2 and the car 4 comes to a stop exactly at the predetermined stopping position X without practical shock.

When the inter-flange distance of the flanged wheel 18a is made 2-3 mm larger than the width of the rail 2, the then angle of rotation of the car 4 becomes so small that the positioning error for the rear part of the car 4 due to rotation thereof can be controlled as small as 10 mm or so.

The above error involved in transfer of the dies 3 is normally almost harmless but, in the case of the work pallet of a machine tool, a still higher positioning precision might be required.

Proposed is, therefore, a plug means, which is provided in the left rear part of the car 4 and on the floor for compensating the positional error caused by the slight rotation of the car 4 as it is stopped by the above-mentioned stopper means 25 so as to ensure highly precise positioning of the dies. Like the car stopper means 25, a tapered plug adapted to be vertically movable by a plugging drive means comprising a hydraulic cylinder and a center bent link is provided on the car 4 and a mating tapered hole to engage the above plug in the floor, so that the car 4 can be precisely positioned as it is stopped by combination of the above stopper means and this plug means.

Alternatively, however, it is also possible to position the car 4 precisely as it is stopped by providing it with a horizontal hydraulic cylinder instead of the above-mentioned plug means and causing the car 4 to undergo compensatory rotation around the stopper 26 until it hits a proper stopping means on the floor.

When the above flanged wheels 18a are made of steel, it is possible to utilize the flange's elastic deformation as it comes into the aforesaid friction contact for shock-absorbing.

Instead of the above flanged wheels 18a, it is also possible to provide an inverted U-sectioned frictional braking means to fit loosely on the rail 2 with its flanges in frictional contact with the sides of the rail 2 and also line the flanges with brake lining.

The stopper pin 26 and hydraulic cylinder 30 of the above stopper means 25 may be arranged either at the lateral center or toward the left end of the car 4 or, alternatively, the stopper pin 26 and the hydraulic cylinder 30 may be arranged on the floor and the stopper plate 28 on the car 4.

The stop commanding means 35 consists essentially of an electric control means connected to the input circuit for the electric motor 20 of the car drive gear 19, and acts on the detection signal from the limit switch 36 to stop the electric motor 20 and apply brake to it.

It is possible to omit either of the electric motor 20 of the car drive gear 19 and the electric motor 7 of the push-pull device 6 and use one electric motor in common for both devices 6 and 19.

Second embodiment (See FIGS. 10 through 13.):

A transferring device for dies is placed in front of a horizontal injection molding machine 50 for exchange of dies.

This transferring device is similar to that of the first embodiment but is characterized by its push-pull device 51.

This push-pull device 51 is provided on a car 52 for each of the seats for dies thereon and has a push-pull hook 54 of a push-pull hook means 53 swingable by a hydraulic cylinder 55.

A sprocket 57 engaging a driving band 56 is pivoted on a bearing block 58, and the bearing block 58 is penetrated through with a guide bar 59 and a screw shaft 60, and the bearing block 58 and the sprocket 57 are moved forward or rearward when the screw shaft 60 is rotationally driven by an electric motor 61 via reduction gear 62 and clutch 63 so that the push-pull hook means 51 can be driven forward or rearward in a push-pull mode.

In order to lay a hydraulic hose 64 for supplying hydraulic oil to the hydraulic cylinder 55 there is provided a hose channel 65 along the driving band 56.

Outside a chain 56a as the driving band 56 there are provided inverted U-sectioned cover members 66 and the U-shaped end faces of the adjacent cover members 66 are brought into contact.

By this bending inwardly of the chain 56a in the straight path after the sprocket 57 can be prevented.

Since the idlers 67 of the chain 56a are guided by the guide members 68, the chain 56a is also prevented from bending outwardly.

Thus, the chain 56a is driven with the sprocket 57 being rotated gradually as the bearing block 58 moves, and the push-pull hook means 51 moves forward or rearward.

The beginning end of the hydraulic hose 64 laid in the hose channel 65 is connected with a hydraulic pressure source (not shown) so that the hydraulic cylinder 55 can be supplied with hydraulic oil.

This way it is possible to swing up and down the push-pull hook 54.

Although it is not illustrated, it is also possible to detect the position of the push-pull hook 54 by providing the push-pull hook means 54 with a limit switch and laying a cable leading to it in the hose channel 65.

It is also possible to arrange the bearing block 58 and the sprocket 57 such that they are movable in the vertical direction.

In the accompanying drawings numeral 69 designates a guide means for the push-pull means 53, 70 a roller conveyor of a car 52, 71 a roller conveyor of an injection molding machine, 72 a centering pin for positioning dies, 73 a clamp device, 74 a nut and 75 a spring for preventing overloading of an electric motor.

Figure 17:
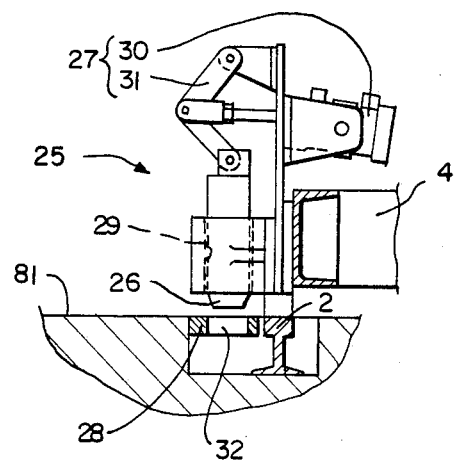
FIGS. 17 and 18 show alternative embodiments for mounting the stopper means.
Figure 18:
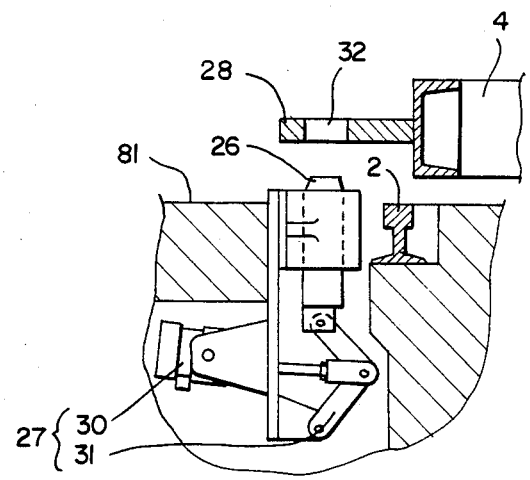

In additional embodiments, stopper plate 28 may be fixed to rails 2 or to floor 81 adjacent to rails 2 as shown in FIG. 17. Alternatively, stopper pin 26 and stopper driving means 27 of the stopper means 25 may be provided on the rails 2 or on the floor 81. In this case, stopper plate 28 is attached to the car 4.

What is claimed is:

1. A transferring device for dies and the like comprising rails, car, stopper means and stopping control means, wherein:

said rails, a pair of front and rear rails, are laid on the floor in parallel;

said car has on its topside at least one seat for dies and the like, at least one of said wheels of said car is arranged to be driven by a car drive gear, and said wheels riding on one rail are flanged, while those riding on the other rail are plain without flange;

said stopper means comprises a stopper pin, stopper pin driving means and a stopper plate, of which said stopper pin and said stopper pin driving means are provided either on the underside of said car on the side of said the other rail or on the fixed side of that rail or the floor in its vicinity, and said stopper plate on the other, said stopper pin is vertically movable by said stopper pin driving means, and said stopper plate is provided with a mating hole so that said car can be stopped at the predetermined stop position by engaging said stopper pin in said mating hole;

said stopping control means comprises a detection means which detects said car when it has reached the start-to-stop position in the vicinity on either, left or right, side of said predetermined stopping position and a stop commanding means, said stop commanding means acts on said detection signal from said detection means to stop said car drive gear, and at the same time said stopper pin is advanced by said stopper pin driving means toward said stopper plate so as to engage in the mating hole; and as the car starts to stop, said car is caused to rotate slightly with its inertia force around the center of said stopper pin so that said flanges of said flanged wheels on the one rail come into frictional contact with the sides of said rail, thus said car is stopped softly without shock.

2. A transferring device for dies and the like as recited in claim 1, said stopper pin and said stopper pin driving means of said stopper means are provided on said car and said stopper plate on the one side of said the other rail.

3. A transferring device for dies and the like as recited in claim 2, a guide face is provided on the topside of said stopper plate on the left or the right of said mating hole.

4. A transferring device for dies and the like as recited in claim 1, said stopper pin and said stopper pin driving means of said stopper means are provided on said the other rail or on the floor and said stopper plate on said car.

* * * * *